Sept. 9, 1924.
G. ALLISON
1,507,654
MACHINE FOR REMOVING THE BOOSTER CHARGE FROM HIGH EXPLOSIVE SHELLS
Filed April 25, 1923
3 Sheets-Sheet 1
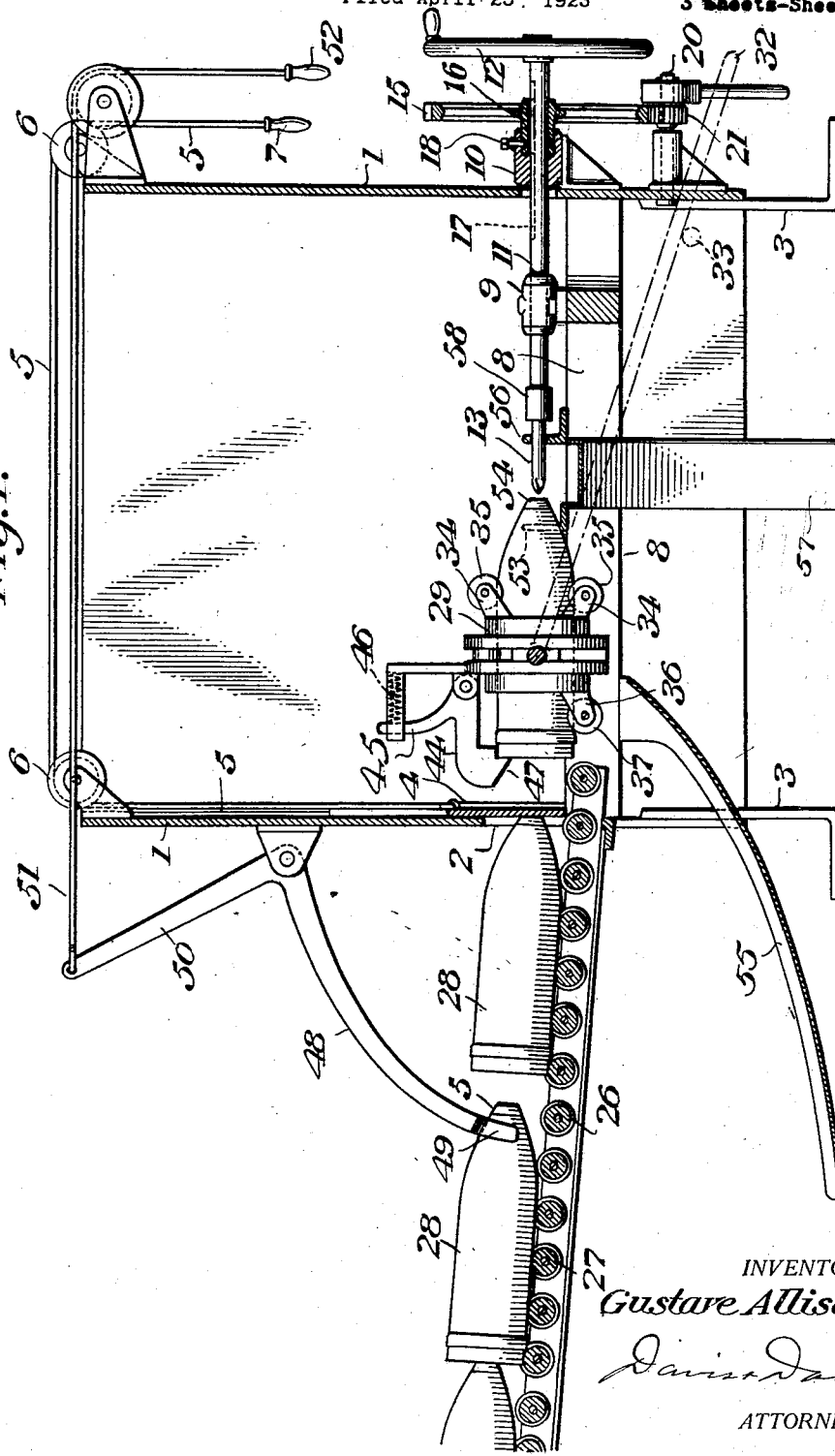
INVENTOR
Gustave Allison
ATTORNEYS Sept. 9, 1924. 1,507,654
G. ALLISON
MACHINE FOR REMOVING THE BOOSTER CHARGE FROM HIGH EXPLOSIVE SHELLS
Filed April 25, 1923 3 Sheets-Sheet 2
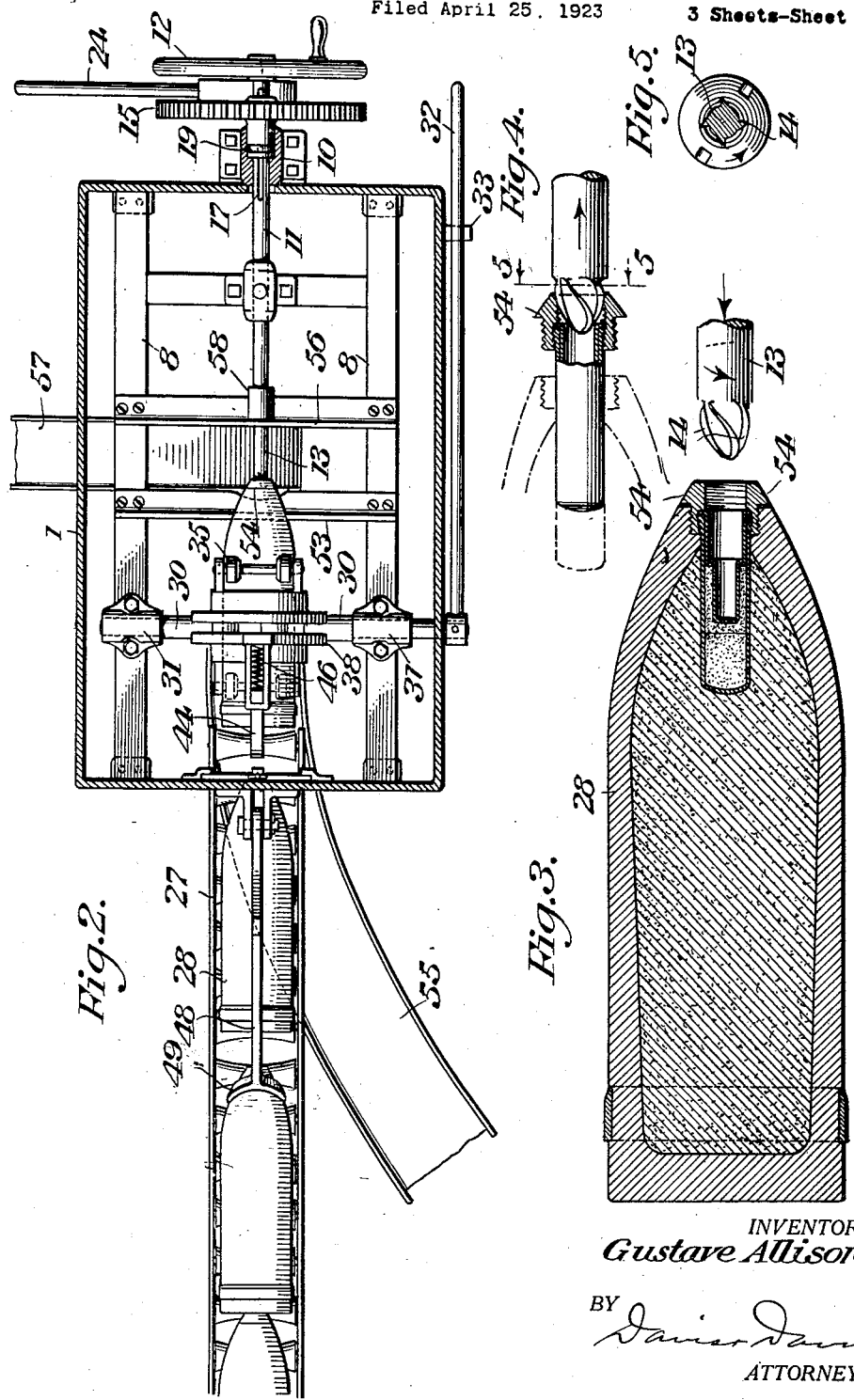
INVENTOR
Gustave Allison
BY
ATTORNEYS

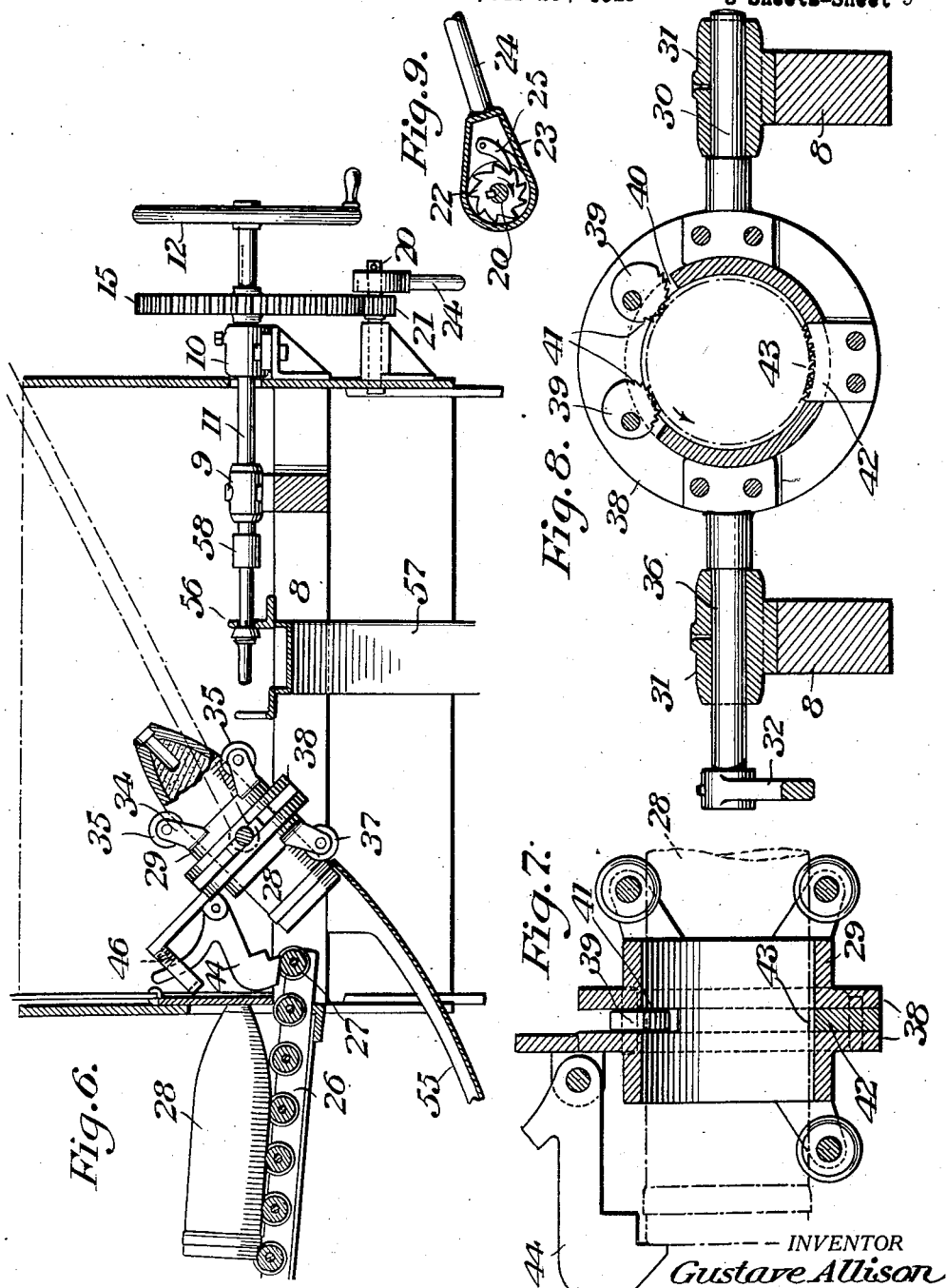

Patented Sept. 9, 1924.

1,507,654

UNITED STATES PATENT OFFICE.

GUSTAVE ALLISON, OF PERTH AMBOY, NEW JERSEY, ASSIGNOR TO COLUMBIA SALVAGE CORPORATION, OF NEW YORK, N. Y., A CORPORATION OF NEW YORK.

MACHINE FOR REMOVING THE BOOSTER CHARGE FROM HIGH-EXPLOSIVE SHELLS.

Application filed April 25, 1923. Serial No. 634,526.

*To all whom it may concern:*

Be it known that I, GUSTAVE ALLISON, a citizen of the United States, and resident of Perth Amboy, in the county of Middlesex and State of New Jersey, have invented certain new and useful Improvements in Machines for Removing the Booster Charge from High-Explosive Shells (Case No. 4), of which the following is a specification.

A high explosive shell for artillery use consists ordinarily of a hollow steel shell filled with a charge of high explosive. The shell is usually pointed at one end and said pointed end is known as the nose. In the nose is formed a longitudinally extending threaded aperture in which is screwed a flanged adapter ring, said ring carrying a small cylindrical casing which extends into the shell and contains the so called booster charge. The fuse or fuse stock is screwed into the adapter ring and this also carries a small explosive charge. The fuse is not attached to the adapter ring until the shell is to be fired. The adapter ring and booster casing are secured to the shell in order to complete the loading thereof and to close the threaded aperture in the nose. This adapter ring and booster casing must be detached from the shell before the high explosive charge can be removed.

The object of this invention is to provide a machine for quickly and safely removing the booster charge from the shell.

There are other objects and advantages of the invention which will appear hereinafter.

In the drawings Fig. 1 is a vertical sectional view of the machine;

Fig. 2 a horizontal sectional view thereof;

Fig. 3 a longitudinal sectional view of a high explosive shell showing the adapter ring and booster casing therein and the booster charge removing tool in position to enter the adapter ring;

Fig. 4 a detail view, partly in section, of the adapter ring and booster casing with the removing tool engaged in the adapter ring;

Fig. 5 a transverse sectional view of the removing tool taken on the line 5—5 of Fig. 4;

Fig. 6 a longitudinal sectional view of the machine showing a booster casing removed and the shell in position to be discharged from the machine;

Fig. 7 a longitudinal sectional view of the chuck for holding the shell during the removing operation;

Fig. 8 a transverse sectional view of the shell holding chuck; and

Fig. 9 a detail sectional view of the ratchet and pawl device for rotating the removing tool.

Referring to the various parts by numerals, 1 designates a strong sheet steel casing which is open at its upper and lower ends and closed on all its sides except for an aperture 2 in the rear wall thereof and through which the shells pass into the casing. This casing is mounted on suitable legs 3 with its open end a short distance above the support on which the legs rest. The aperture 2 is normally closed by a drop door 4, said door being connected to a cable 5 running over pulleys 6 and provided with a handle 7 at the front of the casing. The door may be raised when desired by pulling the cable 5 and will drop into position to close the aperture 2 when the cable is released.

In the casing 1 are secured two horizontal parallel bars 8, the upper surfaces of said bars being slightly above the lower edge of the aperture 2 and being arranged one on each side of the said aperture. Mounted in bearings 9 and 10 is a shaft 11. The bearing 10 is mounted on a bracket secured to the outer side of the front wall of the casing and the shaft 11 is centrally arranged between the supporting bars 8. Its forward end extends beyond the bearing 10 and carries a hand wheel 12 by means of which the shaft may be rotated. Rigidly secured to the inner end of the shaft 11 is a removing tool 13 which is tapered at its end and is provided with a sharp spirally arranged cutting thread 14, said thread being left handed or turned toward the left hand, as viewed in the drawings. The shaft 11 is formed with a key-way 17. Mounted on the shaft 11 near the forward end thereof is a large gear wheel 15 in the hub of which is formed a key 16 which fits in the key-way 17 in the shaft 11 so that the gear will turn said shaft. The shaft 11 is longitudinally slidable through its bearings and through the gear wheel 15. The gear wheel 15 is held rotatably to the bearing 10 by a screw 18 which passes through said bearing and enters a groove 19 in the hub of said wheel. Mounted on the front wall of the casing 1 directly below the shaft 11 is a stub shaft 20 on which is rigidly secured a small pinion 21. Also mounted on said shaft is a ratchet wheel 22; and enclosing said ratchet is a casing 23 to which is connected an operating handle 24. Within the casing is mounted a spring pressed pawl 25 which is adapted to engage the ratchet wheel. By manipulating the handle 24 the gear wheel 15 may be slowly rotated.

A downwardly inclined conveyor 26 is suitably supported at the rear of the casing and leads into the casing through the aperture 2. The conveyor is provided with transverse rollers 27 and is adapted to support the shells 28 and to permit them to roll down the incline into the casing through aperture 2 so that it is only necessary for the operator to place the shells on the conveyors and to permit them to run by gravity down the conveyor into the casing 1. Within the casing 1, adjacent the end of the conveyor 26, is mounted a tubular chuck 29, said chuck being so placed and arranged that the shells moving down the conveyor will be delivered directly into it. The chuck 29 is supported on transverse horizontal trunnions 30 which are journaled in suitable bearings 31 mounted on the bars 8. One of the trunnions 30 is extended outwardly beyond the side wall of the casing 1 and is provided with a long forwardly extending handle 32 which normally rests against a rigid stop 33. By lifting the forward end of the handle 32 the chuck may be tilted for the purpose of discharging a shell therefrom, as will be more fully hereinafter described. The chuck is provided on its forward or inner end with brackets 34 which carry rollers 35, said rollers being slightly beveled in order to adapt them to conform to the contour of the shell. These rollers are arranged at the top and bottom of the chuck in order to engage the upper and lower surfaces of a shell fitting within the chuck. The rear end of the chuck is provided with brackets 36 near its lower edge and these brackets carry rollers 37 which are adapted to engage the shell and support the rear end of it when said shell is within the chuck. The chuck body is formed with annular radial parallel flanges 38 substantially midway the ends thereof and between these flanges are pivoted two gravity-operated clutch-dogs or cams 39. These cams are arranged near the top of the chuck and operate downwardly through a slot 40 so that their serrated gripping edges 41 are adapted to engage a shell within the chuck. A lower rigid gripping dog 42 is secured between flanges 38 and extend upwardly through a slot in the body of the chuck and its upper serrated edge 43 is adapted to engage the lower surface of a shell within the chuck. The gravity dogs 39 are so arranged that they will bite into the shell and prevent the shell turning toward the left, or counter-clock-wise, as viewed in Fig. 8. The tapered front end of the shell as it enters the chuck will automatically move the clutch dogs upwardly so that they will not, in any way, interfere with the proper positioning of the shell in the chuck.

Pivoted to the upper part of the chuck is an automatic latch 44. This latch is adapted to drop down and to engage the base of the shell to hold it in the chuck against rearward longitudinal movement. The latch 44 is provided with an upwardly extending arm 45 which is pressed rearwardly by spring 46. The end of the latch is beveled downwardly to form a cam surface 47 which is adapted to be engaged by the tapered end of the shell so that said latch will be lifted by the shell as it passes into the chuck. When the shell is properly positioned in the chuck the latch will snap down and engage the base thereof.

It is desirable to release the shells on the conveyor one at a time for passage into the casing. For this purpose a downwardly swinging shell arresting lever 48 is pivoted on the rear wall of the casing, said lever being provided at its lower end with a yoke 49 which is adapted to engage the upper surface of the nose of the shell, as shown clearly in Figs. 1 and 2. By this means the shells on the conveyor are held a fixed distance from the casing. The lever 48 is provided with an upwardly extending arm 50 to which an operating cable 51 is connected. This cable is carried to the front of the casing and is provided with an operating handle 52. By pulling on the cable 51 the arrestor lever is lifted from the tapered end of a shell and said shell is permitted to run down the conveyor to the door 4. As soon as one shell is released from the yoke 49 the lever is released so that as said shell passes from under the arrestor lever the yoke 49 will drop down and engage and arrest the next shell in the line. The released shell will move down the conveyor until it is stopped by the door 4.

To permit a shell to run into the casing 1 and into the chuck, the door 4 is raised by a pull on the cable 5. This frees the shell on the conveyor next to the door and permits it to run down the conveyor by gravity and into the chuck. The nose of the chuck will engage a vertical stop bar 53 secured to the bars 8. The stop bar is cut out to receive the nose of the shell as shown clearly in the drawings. When the nose of the shell is in the notch of the stop bar the latch 44 will snap down and engage the base of the shell and the nose of the shell will be axially in line with the shaft 11 and the removing tool 13. The shaft 11 is now forced inwardly to cause the tapered cutting end of the removing tool to enter the adapter ring 54 which is screwed into the nose of the shell. The shaft 11 is then rotated counter-clock-wise by the hand wheel 12. This causes the cutting ribs or threads to bite into the adapter ring and a continued rotation of the shaft 11 will unscrew the adapter ring from the shell. Any tendency of the shell to rotate counter-clock-wise will be checked by the cam clutch dogs 39. If the adapter ring cannot be turned by power applied to the hand wheel 12 the ratchet mechanism is operated and by that means a greater power can be applied to the shaft 11. During the rotation of the shaft through the hand wheel 12 the gear wheel 15 and the pinion 21 will rotate, and the ratchet wheel 22 will rotate with the pinion. The pawl 25 will slip over the teeth of the ratchet wheel. The pawl is so arranged that by an up-and-down movement of the operating lever 24 the pinion will be rotated in the proper direction to cause the gear wheel 15 and the shaft 11 to move counter-clockwise. During the operation of removing the adapter ring and booster casing the latch 44 will hold the shell against the thrust of the removing tool.

When the booster casing, containing the booster charge, has been unscrewed and removed from the shell the handle 32 is raised in order to tip the chuck, as indicated in Fig. 6 of the drawings. The tipping movement of the chuck will cause the cam surface 47 of the latch to engage the end roller 27 of the conveyor and release the latch from the shell. This will permit the shell to drop from the chuck into a chute 55 which will carry it out of the casing. The shaft 11 is withdrawn to cause the adapter ring to engage a bar 56, said bar serving as a means to strip the adapter ring and the booster casing from the removing tool. The booster casing and adapter ring will drop into a chute 57 which will carry them out of the casing 1.

Before the removing tool is brought into engagement with the adapter ring the door 4 is closed so that the operation of removing the booster charge takes place within the casing 1. The purpose of this is to protect the workmen or operator from any danger of a possible explosion of the shell during the removing operation. The casing 1 is open at its top and bottom and its bottom is raised above the support on which the legs 3 rest in order that the gases due to an explosion will not be confined. The steel casing 1 is heavy enough to withstand a shell explosion within it provided the top and bottom of the casing are open.

The weight of the chuck and of the operating handle 32 is such that the chuck will normally be in a horizontal position ready to receive a shell from the conveyor. The body of the removing tool is larger in diameter than the threaded aperture in the adapter ring in order to prevent any possibility of passing it through said aperture into the booster casing. The shaft 11 is provided with a stop collar 58 which is adapted to engage the bar 56 to limit the movement of the shaft toward the chuck.

It is manifest that an operator standing in front of the machine may manipulate the shell arresting lever and the door 4 and thereby feed shells one by one down the conveyor into the casing and into the chuck. It is also manifest that the booster casing may be removed from the shell and discharged into the chute 57 and that the shell may be deposited into the chute 55. All of these operations are performed by the operator standing in front of the machine and outside of the casing.

What I claim is:

1. The combination of a casing having an aperture in one side, a conveyer entering said casing through said aperture, a door for said aperture, a pivotally mounted horizontal chuck within the casing and adapted to receive a shell from the said conveyor, means for holding the shell in said chuck against a counter-clock-wise rotation, a rotatable and longitudinally slidable shaft extending into said casing, a removing tool secured to the inner end of said shaft, means for rotating said shaft, and means for tilting the chuck to release the shell therefrom.

2. The combination of a casing, a pivotally mounted tubular chuck therein, means for delivering shells to said chuck, a rotatable and longitudinally slidable shaft extending into said casing in axial alignment with the chuck, a removing tool carried by said shaft at the inner end thereof, means for rotating the shaft, and means for tilting the chuck to discharge the shell therefrom.

3. The combination of a pivotally mounted tubular chuck, means for delivering shells into said chuck, means for locking said shells in position therein, a longitudinally slidable and rotatable removing tool axially in alignment with the chuck and adapted to be brought into engagement with the end of the shell within the chuck, and means for tilting the chuck to discharge the shell therefrom.

4. The combination of a pivotally mounted tubular chuck, means for delivering shells into said chuck, means for locking said shells in position therein, a longitudinally slidable and rotatable removing tool axially in alignment with the chuck and adapted to be brought into engagement with the end of the shell within the chuck, means for tilting the chuck to discharge the shell therefrom, and means to engage and release the shell-locking means when the chuck is tilted.

5. The combination of a pivotally mounted horizontal tubular chuck, means for normally maintaining said chuck in a horizontal position, means for delivering a shell, tapered end first, into said chuck, means for automatically locking said shell in position therein, means for holding the shell in said chuck against counter-clock-wise rotation, a rotatable removing tool axially in alignment with the chuck and adapted to be brought into engagement with the tapered end of the shell, means for tilting said chuck to elevate the tapered end of the shell, and means to engage and release the shell-locking means as the chuck is tilted to thereby permit the shell to drop from the chuck.

6. The combination of a pivotally mounted horizontal tubular chuck, means for normally maintaining said chuck in a horizontal position, means for delivering a shell, tapered end first, into said chuck, means for automatically locking said shell in position therein, a pair of gravity clutch dogs carried by the chuck and adapted to hold the shell in the chuck against counter-clock-wise rotation, a rotatable removing tool axially in alignment with the chuck and adapted to be brought into engagement with the tapered end of the shell, means for tilting said chuck to elevate the tapered end of the shell, and means to engage and release the shell-locking means as the chuck is tilted and to thereby permit the shell to drop from the chuck.

7. The combination of a pivotally mounted horizontal tubular chuck, means for normally maintaining said chuck in a horizontal position, means for delivering a shell, tapered end first, into said chuck, an automatically operated spring latch carried by the chuck and adapted to engage the base of the shell and lock it in position in the chuck against rearward movement, a pair of gravity clutch dogs carried by the chuck and adapted to hold the shell in the chuck against counter-clock-wise rotation, a rotatable removing tool axially in alignment with the chuck and adapted to be brought into engagement with the tapered end of the shell, means for tilting said chuck to elevate the tapered end of the shell, and means to engage and release the shell-holding latch as the chuck is tilted and to thereby permit the shell to drop from the clutch.

8. The combination of a casing having an aperture in its rear side, an inclined conveyor entering said casing through said aperture, a door for said aperture, means for arresting the shells on the conveyor, means for removing said shell arresting means to permit the shells to move one by one down the conveyor to the casing, a pivotally mounted horizontal tubular chuck within the casing and adapted to receive the shells from said conveyor, means for holding the shells in said chuck against a counter-clock-wise rotation, a rotatable removing tool adapted to be brought into engagement with the end of the shell within the chuck, and means for tilting the chuck to discharge a shell therefrom.

9. The combination of a casing having an aperture in one side and having an open bottom and top, a chuck in said casing, means for automatically delivering a shell to said chuck, means carried by said chuck to prevent a counter-clock-wise rotation of a shell within the said chuck, a rotatable removing tool within the casing and axially in line with the chuck, means outside of the casing for rotating said removing tool counter-clock-wise, and means outside of the casing and connected to the chuck for tilting the chuck to discharge a shell therefrom.

10. The combination of a chuck adapted to receive a shell, means to deliver shells one at a time into the chuck by gravity, means to automatically lock the shell in the chuck, a removing tool adapted to engage the booster unit of the shell, and means to cause relative rotation between the shell and the said removing tool whereby the booster unit will be unscrewed from the shell.

11. The combination of a chuck adapted to receive a shell, a conveyor to deliver shells into the chuck, means to control the shell delivery, means to lock the shell in the chuck, a removing tool adapted to engage the booster unit of the shell, and means to cause relative rotation between the shell and said removing tool whereby the booster unit will be unscrewed from the shell.

12. The combination of a chuck adapted to receive a shell, means to lock the shell in the chuck, a removing tool adapted to engage the booster unit of the shell, means to cause relative rotation between the shell and the said removing tool whereby the booster unit is unscrewed from the shell, an armor casing adapted to enclose the shell and the removing tool during the booster removing operation, and means to discharge the shell from the chuck.

13. The combination of a chuck adapted to receive a shell, means to lock the shell in the chuck, a removing tool adapted to enter a hole in the end of the booster unit of the shell and grip said unit, means to cause relative rotation between the shell and the said removing tool whereby the booster unit will be unscrewed from the shell, and an armor casing adapted to enclose the shell and the removing tool during the booster removal operation.

14. The combination of a chuck adapted to receive a shell, means to lock the shell in the chuck, a removing tool adapted to grip the booster unit of the shell, means to cause relative rotation between the shell and the said removing tool whereby the booster unit is unscrewed from the shell, means to strip the withdrawn booster unit from the removing tool, and means to discharge the shell from the chuck.

15. The combination of a pivotally mounted horizontal tubular open ended chuck the pivots thereof being transverse to the axis of the chuck, means for delivering a shell tapered end first into said chuck, means for locking said shell in position therein, a longitudinally slidable removing tool axially in alignment with the chuck and adapted to be brought into engagement with the tapered end of the shell, means for causing a relative rotative movement between the removing tool and the chuck, and means for tilting the chuck on its pivots to discharge the shell therefrom.

In testimony whereof I hereunto affix my signature.

GUSTAVE ALLISON.